(12) United States Patent
Dees et al.

(10) Patent No.: US 11,219,328 B2
(45) Date of Patent: Jan. 11, 2022

(54) SYSTEM FOR PREPARING BEVERAGE CONSUMPTIONS

(71) Applicant: Koninklijke Douwe Egberts B.V., Utrecht (NL)

(72) Inventors: Hendrik Johan Dees, Utrecht (NL); Craig Martin Wilkinson, Utrecht (NL); Leonardus Henricus Wilhelmus Giesen, Utrecht (NL); Pim Verburg, Utrecht (NL); Wouter Plechelmus Bernardus Nijland, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 1489 days.

(21) Appl. No.: 15/197,093

(22) Filed: Jun. 29, 2016

(65) Prior Publication Data

US 2016/0309948 A1    Oct. 27, 2016

Related U.S. Application Data

(63) Continuation of application No. PCT/NL2014/050916, filed on Dec. 29, 2014.

(30) Foreign Application Priority Data

Jan. 3, 2014   (NL) .................................... 2012046

(51) Int. Cl.
*A47J 31/40* (2006.01)
*A47J 31/41* (2006.01)

(52) U.S. Cl.
CPC ........... *A47J 31/402* (2013.01); *A47J 31/407* (2013.01); *A47J 31/41* (2013.01)

(58) Field of Classification Search
CPC ......... A47J 31/402; A47J 31/407; A47J 31/41

(Continued)

(56) References Cited

U.S. PATENT DOCUMENTS 3,760,991 A    9/1973   Brouwer et al.
4,793,520 A  * 12/1988  Gerber ..................... A23G 9/28
                                                       222/129.1

(Continued)

FOREIGN PATENT DOCUMENTS

CN    1942127 A    4/2007
CN    101115422 A   1/2008

(Continued)

OTHER PUBLICATIONS

Chinese Search Report, CN 201480075280.0 (dated Jun. 13, 2018).

(Continued)

*Primary Examiner* — Dana Ross
*Assistant Examiner* — Joe E Mills, Jr.
(74) *Attorney, Agent, or Firm* — Fitch, Even, Tabin & Flannery LLP

(57) ABSTRACT

A system for preparing beverage consumptions comprising an appliance to prepare and dispense a beverage and at least one exchangeable supply pack. The appliance includes a loading channel to receive the exchangeable supply pack. The exchangeable supply pack has a container to hold a beverage related ingredient, a drive port to receive a driving torque and an ingredient outlet port. The loading channel has a protruding drive shaft for transmitting torque from the appliance to the supply pack, and an ingredient receiving connector for conveying the ingredient from the supply pack to the appliance. The drive port and outlet port of the supply pack are coupled to the drive shaft and the receiving connector. The drive port includes an opening with a concave tapered inner wall defining a funnel shape and cooperates with the protruding drive shaft to assist in aligning the outlet port with respect to the receiving connector.

22 Claims, 10 Drawing Sheets

(58) Field of Classification Search
USPC ......... 235/375; 222/1, 23, 54, 56, 64, 129.1,
222/130, 327, 333, 642; 62/56; 99/287,
99/290, 295, 323
See application file for complete search history.

(56) References Cited

U.S. PATENT DOCUMENTS

| | | | |
|---|---|---|---|
| 5,836,482 A | 11/1998 | Ophardt et al. | |
| 6,974,052 B1 * | 12/2005 | d'Hond | G01F 11/22 |
| | | | 222/63 |
| 8,820,577 B2 * | 9/2014 | Rusch | B67B 7/28 |
| | | | 222/129.1 |
| 2009/0145926 A1 | 6/2009 | Klopfenstein et al. | |

FOREIGN PATENT DOCUMENTS

| | | |
|---|---|---|
| CN | 102574672 A | 7/2012 |
| FR | 2672279 A1 | 8/1992 |
| JP | 47-037566 | 12/1972 |
| JP | 49-111650 | 10/1974 |
| JP | 10-238486 | 9/1998 |
| NL | 2004367 | 3/2011 |
| WO | WO-2013/122933 | 8/2013 |

OTHER PUBLICATIONS

International Search Report and Written Opinion, PCT/NL2014/050916, Koninklijke Douwe Egberts B.V., 8 pages (dated Mar. 20, 2015).
English-language translation of Office Action, JP App. No. 2016-544091 (dated Nov. 15, 2018).

* cited by examiner

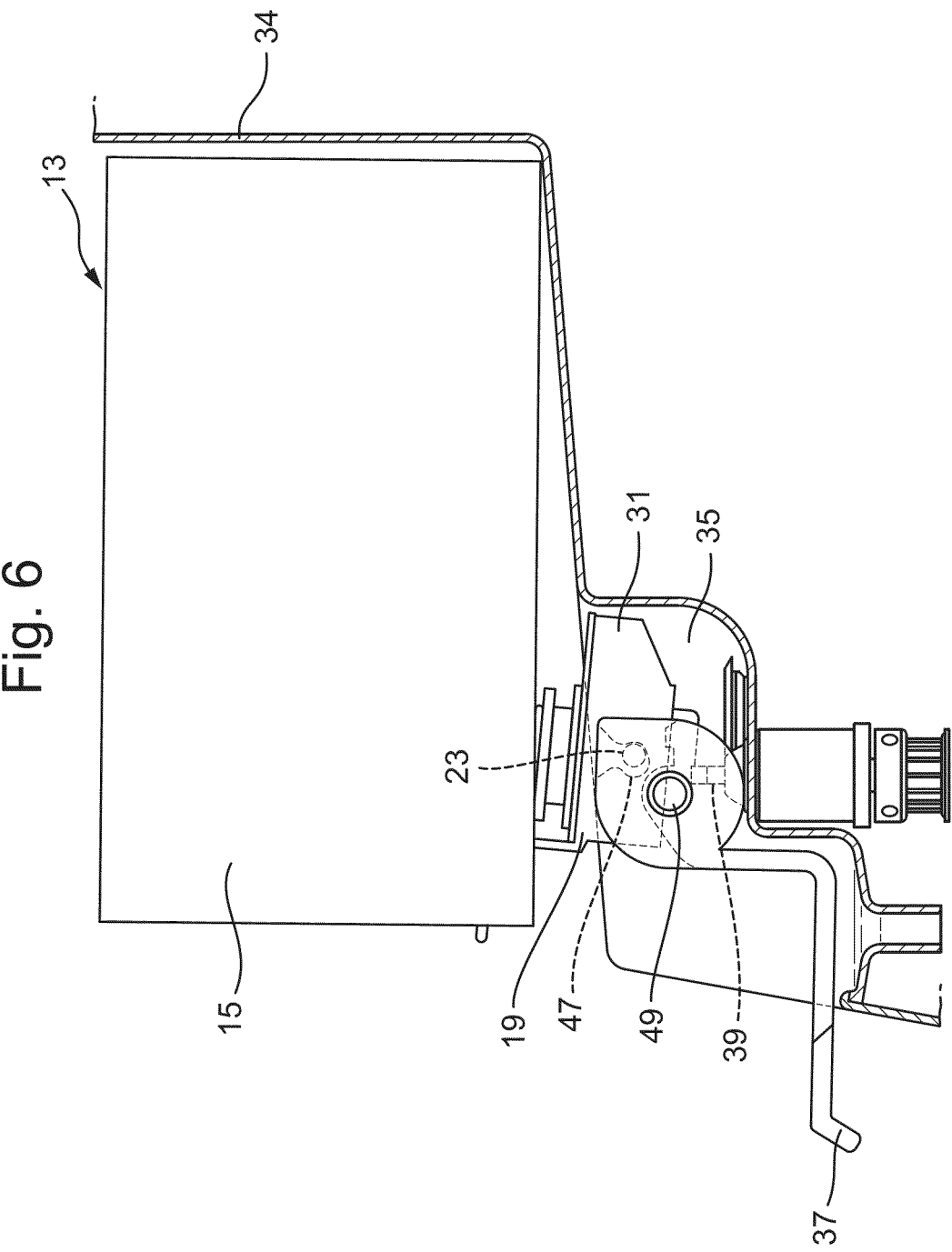

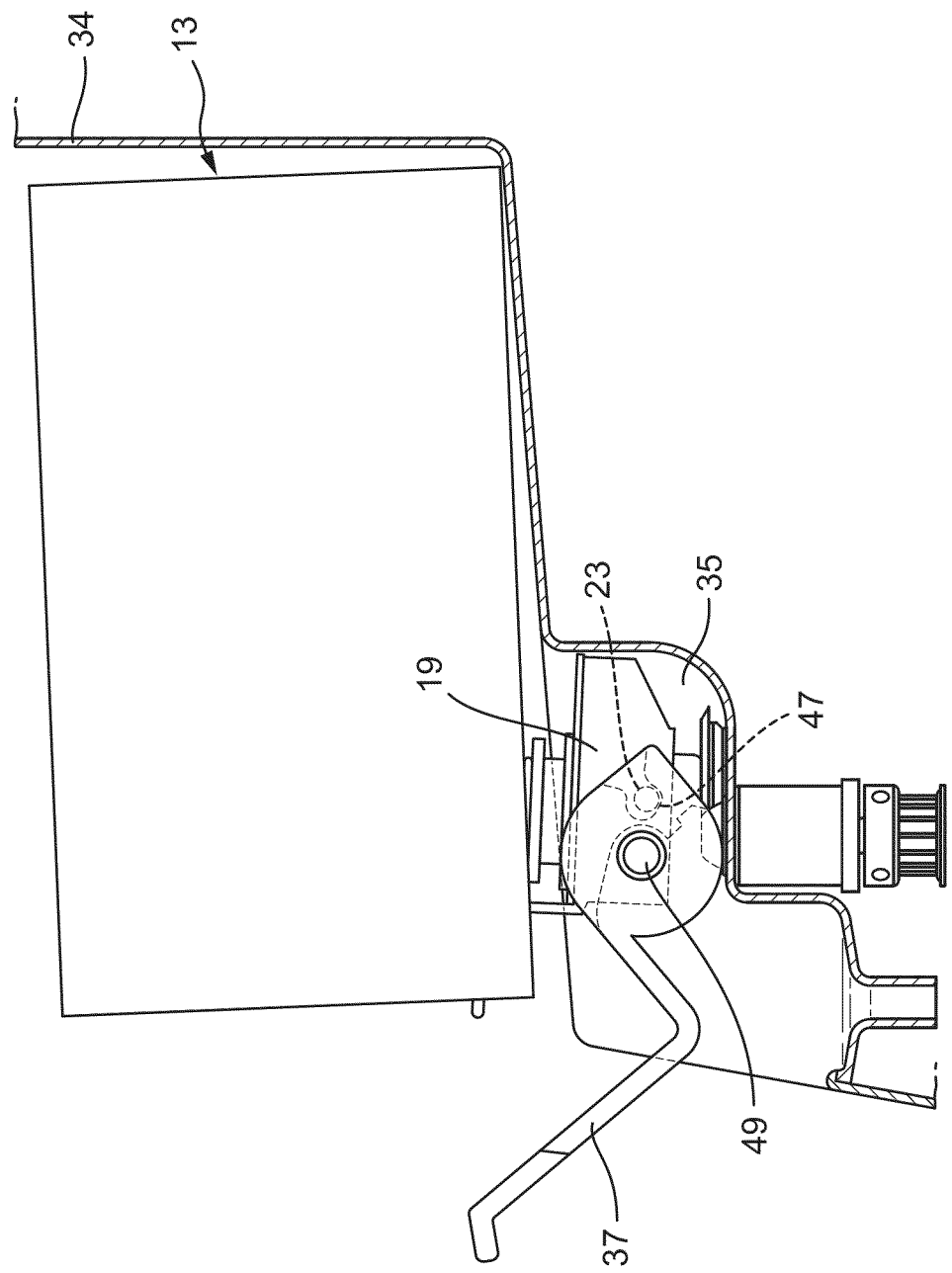

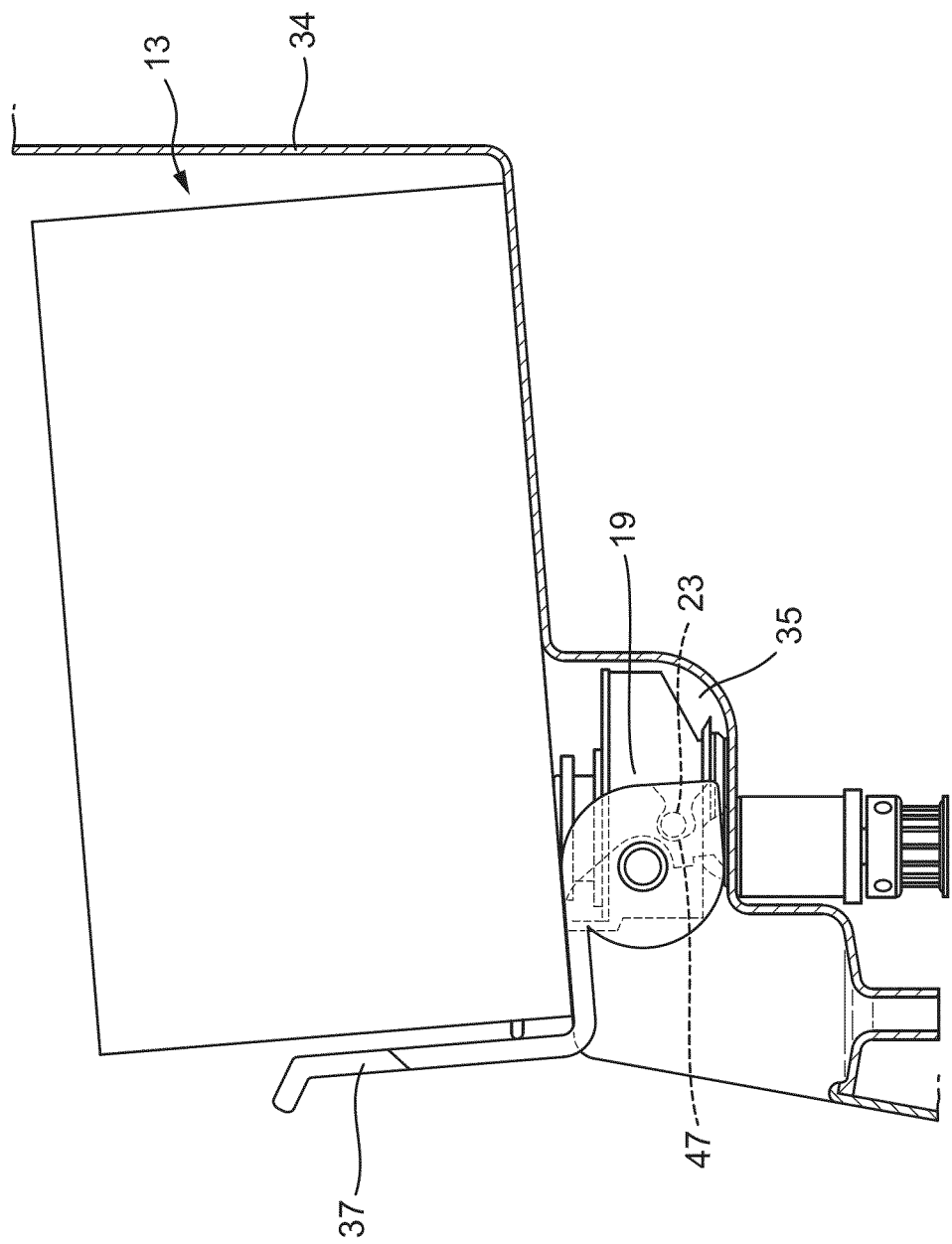

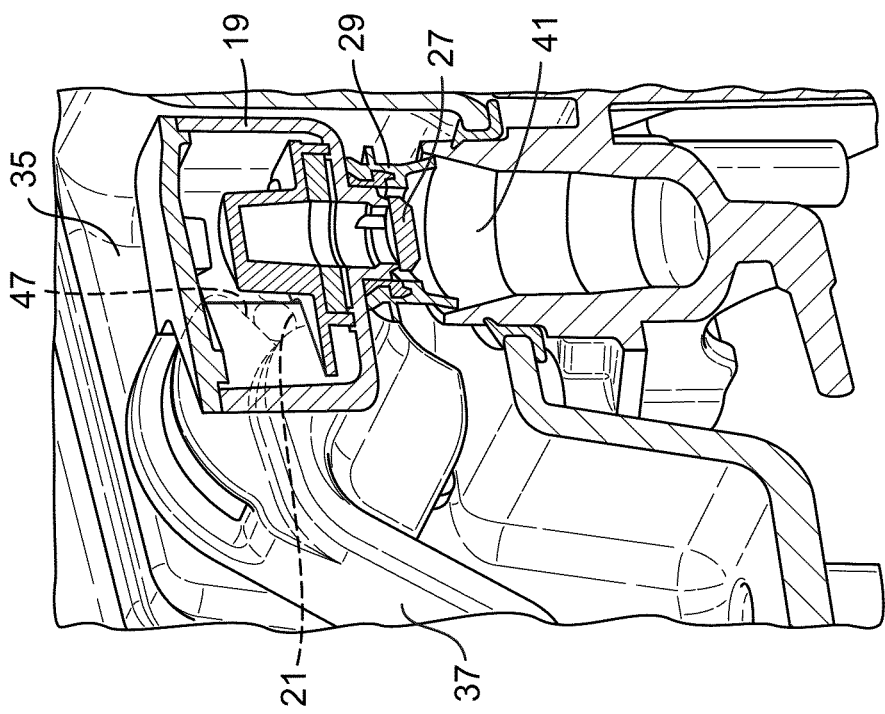
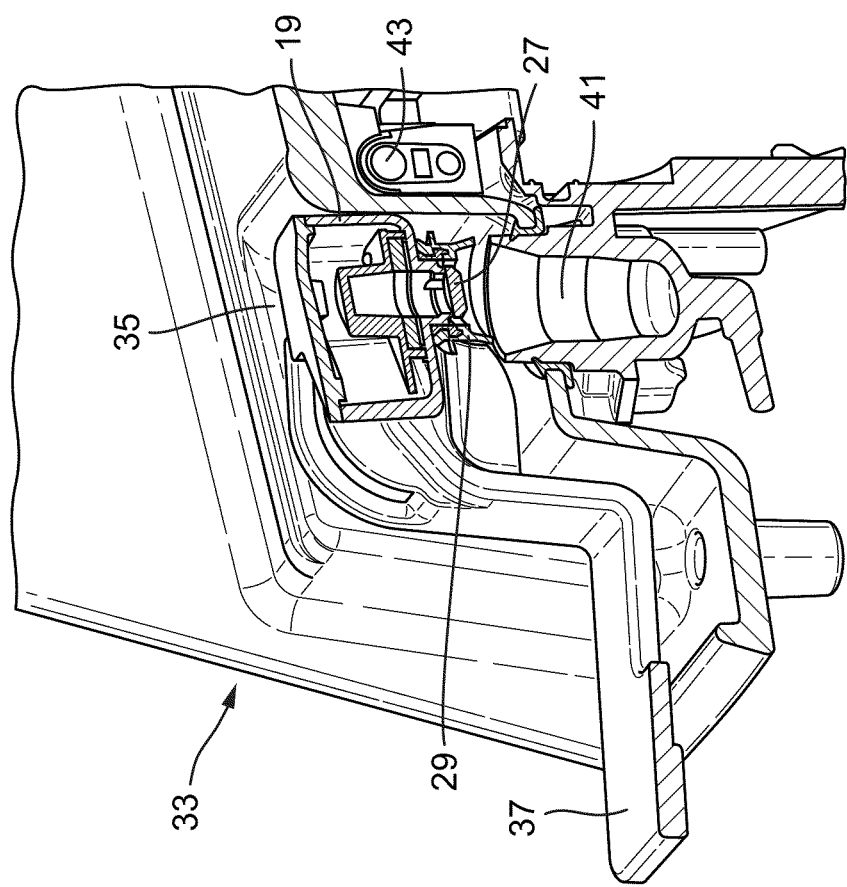

SYSTEM FOR PREPARING BEVERAGE CONSUMPTIONS

CROSS-REFERENCE TO RELATED PATENT APPLICATIONS

The present application is a continuation of International Patent Application No. PCT/NL2014/050916, filed on Dec. 29, 2014, which claims priority to Netherlands Patent Application No. NL2012046, filed Jan. 3, 2014, all of which are incorporated herein by reference in their entirety.

BACKGROUND

The invention relates to a system for preparing beverage consumptions and a method for its operation. More in particular the invention relates to such a system having an appliance arranged for preparing and dispensing a beverage consumption, and an exchangeable cartridge or supply pack arranged for holding and supplying a beverage related ingredient.

Such beverage preparing systems are generally known, and a particular example is disclosed in U.S. Pat. No. 6,974,052. A proper functioning of such known systems depend on a connection between an ingredient outlet port of the exchangeable cartridge or supply pack and an ingredient receiving connector of the appliance. Often these connections need to handle liquid substances and mostly one of the outlet port and the receiving connector includes a resilient sealing element. Because such sealing elements are intended to provide a fluid tight seal, these are not only resiliently flexible, but also have an interference fit with the relevant other of the receiving connector or outlet port. At times this resiliency and interference fit has caused difficulties in positioning the exchangeable cartridge or supply pack with respect to the apparatus. Even when positioning was successfully accomplished, the positioning operation may still have compromised the integrity of the resilient sealing member.

SUMMARY

Accordingly it is an object of the present invention to propose an improved system for preparing beverage consumptions. In a more general sense it is thus an object of the invention to overcome or reduce at least one of the disadvantages of the prior art. It is also an object of the present invention to provide alternative solutions, which are less cumbersome in assembly and operation and which moreover can be made relatively inexpensively. Alternatively it is an object of the invention to at least provide a useful alternative.

To this end the invention provides for a system and method as defined in one or more of the appended claims. More in particular the invention may advantageously include one or more of the following features.

A system for preparing beverage consumptions, in accordance with the invention, may comprise an appliance arranged for preparing and dispensing a beverage consumption; and at least one exchangeable supply pack arranged for holding and supplying a beverage related ingredient. The appliance includes a loading channel arranged for receiving the at least one exchangeable supply pack. The at least one exchangeable supply pack is provided with a container for holding a beverage related ingredient, a drive port for receiving a protruding drive shaft and an ingredient outlet port. The loading channel of the appliance has a protruding drive shaft for transmitting torque from the appliance to the at least one exchangeable supply pack, and an ingredient receiving connector for conveying the beverage related ingredient from the at least one exchangeable supply pack to the appliance. The appliance can include lever means arranged for simultaneously allowing coupling the drive port and ingredient outlet port of the at least one exchangeable supply pack to the drive shaft and the ingredient receiving connector of the appliance. The drive port includes an opening with a concave tapered inner wall defining a funnel shape adapted to cooperate with the protruding drive shaft to assist in aligning the ingredient outlet port with respect to the ingredient receiving connector during coupling of the at least one exchangeable supply pack to the appliance. In a system with at least the aforementioned features the aligning character of the protruding drive shaft with respect to the tapered opening in the drive port of the exchangeable supply pack advantageously assist in the coupling of the outlet port and receiving connector and reduces any risk of any flexible sealing elements in sustaining damage. During coupling of an exchangeable supply pack to the appliance the protruding drive shaft is at first within the boundaries of the funnel shaped entrance portion of the drive port. The protruding shaft then touches a tapered inner wall of the funnel shaped entrance portion of the drive port to thereby be further guided into a central bore of a drive pinion within the exchangeable supply pack. The guidance is continued by the protruding shaft and the tapered inner wall of the drive port until engagement of the protruding drive shaft with the central bore of the drive pinion is achieved. Finally the protruding shaft will be fully engaged with the drive pinion.

Accordingly in one embodiment of the system the ingredient outlet port may have a flexible annular seal. The ingredient receiving connector of the same embodiment may further have a funnel shaped opening with an inner wall adapted to engage the flexible annular seal.

In another embodiment, or further development of the one embodiment, the at least one exchangeable supply pack can include a doser for expelling dosed amounts of the beverage related ingredient from the container through the ingredient outlet port. The drive port can then conveniently be part of the doser, and be arranged for transmitting a driving torque from a protruding drive shaft to a pump within the doser. The doser may also protrude from the container. In this regard the loading channel of the appliance may then include a cavity arranged for receiving the protruding doser of the exchangeable supply pack, and wherein the protruding drive shaft, and the ingredient receiving connector are associated with the cavity. The drive port and ingredient port are then also conveniently arranged on a lower face of the doser, and the protruding drive shaft and the ingredient receiving connector are then arranged on a bottom wall of the cavity.

When provided the lever means may be arranged for engaging the doser for coupling the drive port and ingredient outlet port of the at least one exchangeable supply pack simultaneously to the drive shaft and the ingredient receiving connector of the appliance.

An exterior contour of the doser, and an interior contour of the cavity can be shaped complementary to one another to additionally assist in aligning the ingredient outlet port with respect to the ingredient receiving connector during coupling of the at least one exchangeable supply pack to the appliance.

The doser can include opposite laterally protruding pivot studs and the lever means is arranged to mechanically engage the laterally protruding pivot studs for positioning and moving the doser.

The loading channel can conveniently be arranged to permit the doser to be manipulated between a position with the doser of the exchangeable supply pack received in the cavity and a position in which the exchangeable supply pack is fully connected to the appliance.

Sensor means can further be associated with the cavity for detecting at least one of proper exchangeable supply pack positioning and availability of beverage related ingredient in a positioned exchangeable supply pack. Such sensor means can be arranged to communicate with a control unit to assist in controlling at least one of a start-up cyclus and individual dosing cycli.

The protruding drive shaft can include a flexible portion. When the drive shaft is provided with a flexible portion, its protruding end may accommodate minor misalignments when driving the doser pump pinion. Such misalignment could otherwise cause additional friction and energy losses.

The protruding drive shaft can also protrude from a convex boss on the appliance, which convex boss is adapted to mate with the concave interior shape of the drive port when the at least one supply pack is fully engaged with the appliance after being coupled thereto.

In this further improvement the protruding drive shaft of the appliance is surrounded by a convex boss, which mates with the concave tapered interior of the drive port, when the protruding shaft is fully engaged with the drive pinion.

The container can substantially define an outer bound of the at least one supply pack, which can be arranged to mate with the loading channel, and effective to further assist in the aligning of the ingredient outlet port with respect to the ingredient receiving connector during coupling of the at least one exchangeable supply pack to the appliance.

The container can be a flexible bag housed in a rigid enclosure.

The beverage related ingredient is a liquid substance which may include but is not limited to coffee extracts, tea extracts, chocolate beverages, milk, flavours, juices, and/or concentrates thereof.

A doser of the system according to the invention can include: an internal pump having a drive pinion; a drive port for transmitting a drive torque to the drive pinion; an ingredient outlet port; an exterior contour shaped to be complementary to a cavity of the appliance; and opposite laterally protruding pivot studs arranged to be engaged by lever means of the appliance. In such a doser the drive port and the ingredient outlet port may conveniently be positioned on one face of the doser. Furthermore the drive port may have a funnel shaped entrance opening, and the outlet port can be provided with a flexible resilient annular seal. Such a doser alternatively may be provided as a recoverable unit, which may be disassembled from a used supply pack and reused on a fresh supply pack that is supplied without a doser. A reusable doser can have benefits to the environment by saving on waste and raw materials. Also supply pack containers without a protruding doser may have benefits in packaging and shipping.

A method of positioning at least one exchangeable supply pack arranged for supplying a beverage related ingredient on an appliance for preparing and dispensing a beverage, may include a step of positioning the at least one supply pack into a loading channel of the appliance, a step of operating lever means of the appliance effective to simultaneously coupling a drive port and an ingredient outlet port of the at least one supply pack to a protruding drive shaft and an ingredient receiving connector of the appliance, and a step of ensuring that an opening with a concave tapered inner wall of the drive port defining a funnel shape cooperates with the protruding drive shaft to assist in aligning the ingredient outlet port with respect to the ingredient receiving. This method can be carried out by using the at least one supply pack and the appliance of a system having one or more of the above listed features.

BRIEF DESCRIPTION OF THE DRAWINGS

Further advantageous aspects of the invention will become clear from the appended description and in reference to the accompanying drawings, in which:

FIG. 6 is a schematic side view, partly in cross section, of the supply pack positioned in the loading channel for connection to the appliance;

FIG. 7 is a side view similar to FIG. 6 showing the supply pack during connection to the appliance;

FIG. 8 is a side view similar to FIG. 6 showing the supply pack fully connected to the appliance;

FIG. 13 is a perspective detail view, partly in cross section, of the beverage ingredient outlet port prior to connection;

FIG. 14 is an enlarged detail similar to FIG. 13 showing the beverage ingredient outlet port during connection;

DETAILED DESCRIPTION

Figure 1:
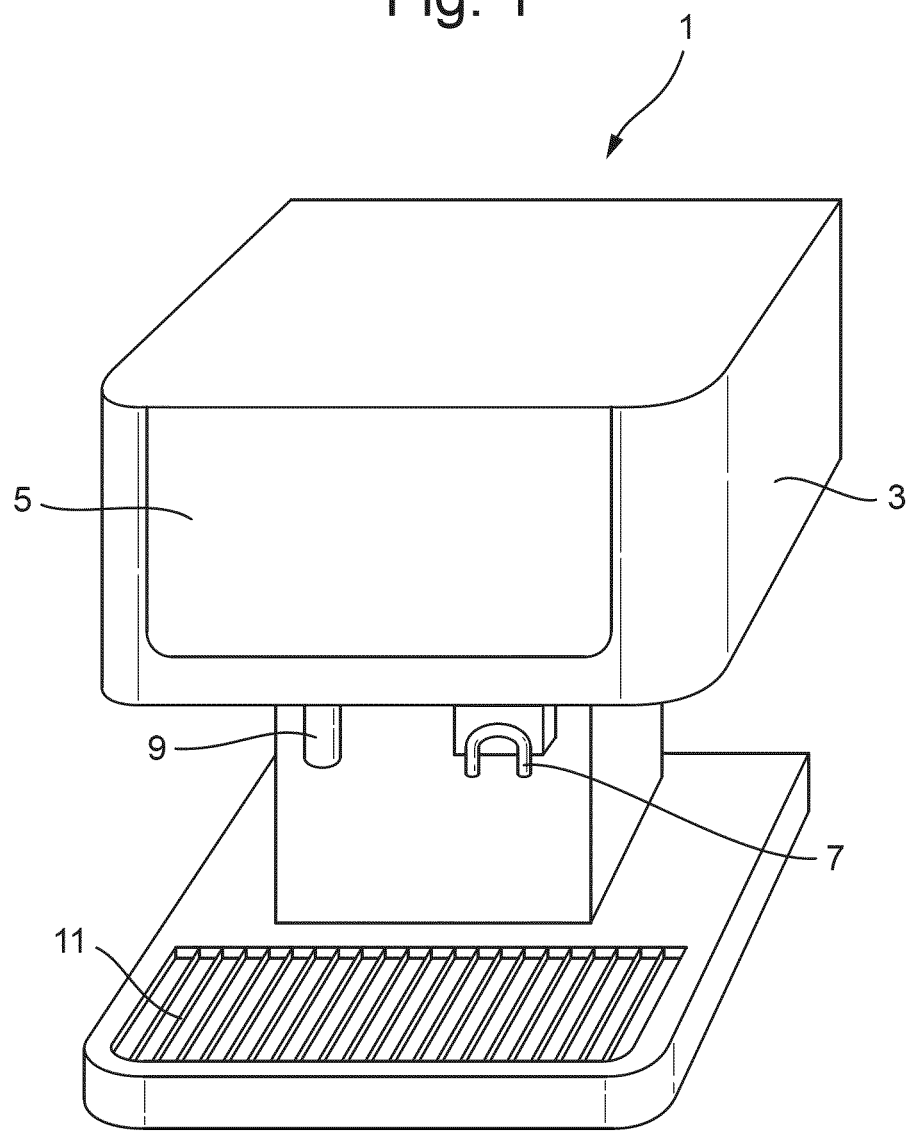
FIG. 1 shows an appliance for preparing beverage consumptions in accordance with the system of the invention.

A system 1 according to the invention includes a beverage consumption preparing and dispensing appliance 3. The beverage appliance 3 includes a supply pack compartment for receiving exchangeable supply packs with beverage related ingredients. The compartment is closed by a front hatch 5, which can be opened to give access to the compartment. Apart from the features described herein below, the appliance 3 is of a conventional type and can include a water jet mixer for mixing, e.g., concentrated liquid coffee or milk ingredients with hot water for dispensing through either a coffee outlet 7 or a milk outlet 9. A spillage receiving tray 11 may be provided in a pedestal of the appliance 3.

Figure 2:
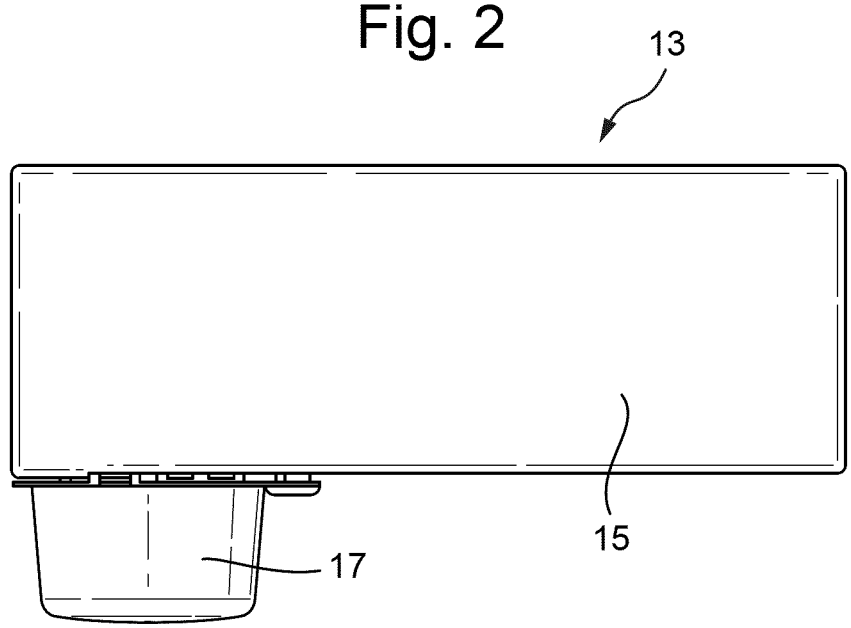
FIG. 2 is an exchangeable beverage ingredient supply pack for use with the system according to the invention.
Figure 3:
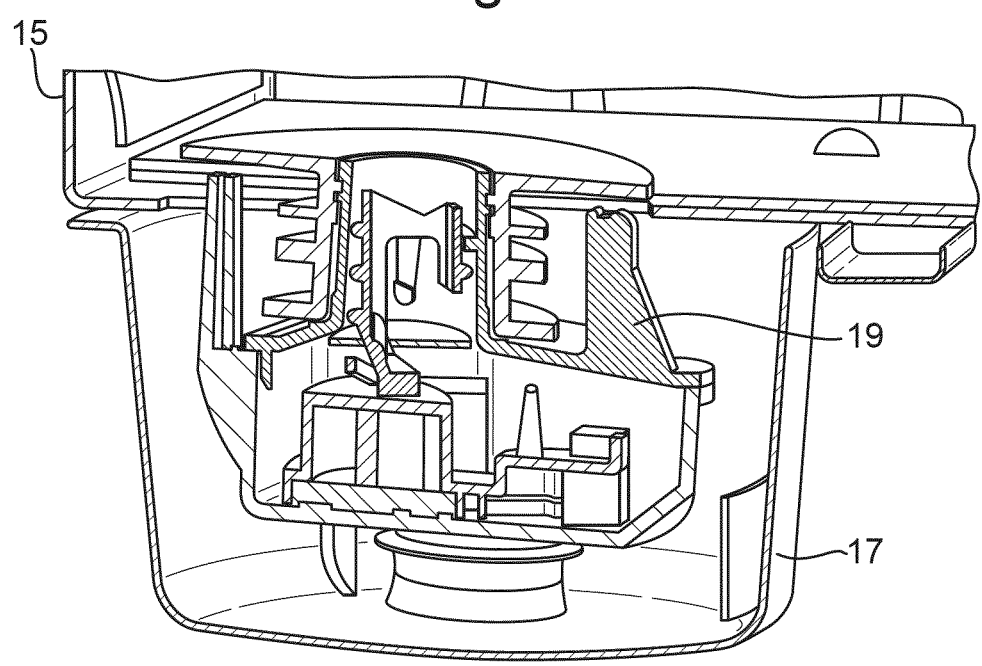
FIG. 3 is an enlarged detail of the supply pack of FIG. 2.
Figure 4:
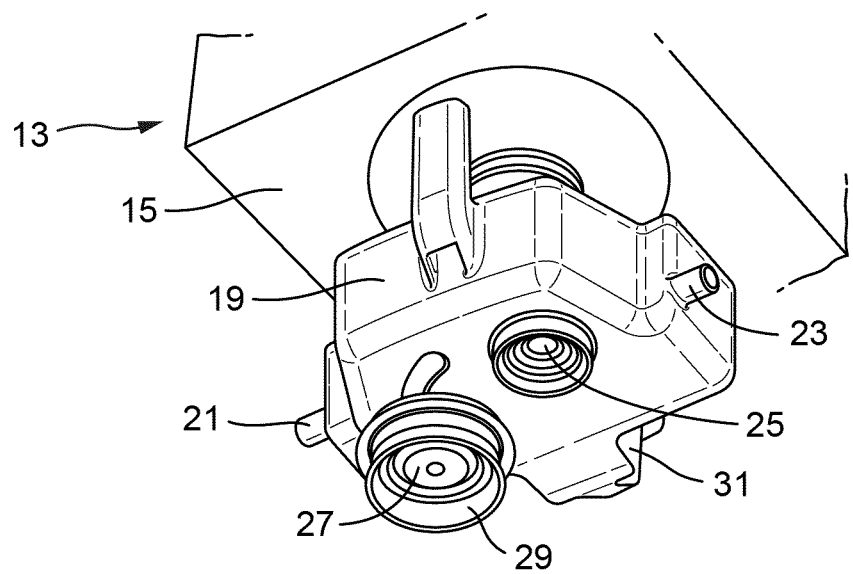
FIG. 4 shows a doser of the supply pack of FIGS. 2 and 3 from below.

An exchangeable beverage ingredient supply pack 13 is shown in FIG. 2. The beverage supply pack 13 may conveniently be of a bag-in-box type having a rigid outer container housing 15 and a removable protective cap 17 for protecting a protruding doser 19 visible in the enlarged detail view of FIG. 3. After removing the cap 17 the supply pack 13 is ready for insertion into the supply pack compartment of the appliance 3 after opening of the front hatch 5. As shown in FIG. 4 the protruding doser 19 has lateral pivot stud projections 21, 23 on opposite lateral sides. Also visible in FIG. 4 on a bottom face of doser 19 are a drive port 25 and an ingredient outlet port 27. The ingredient outlet port 27 is provided with a flexible resilient annular seal 29. The doser 19 further includes a protruding sample chamber 31.

Figure 5:
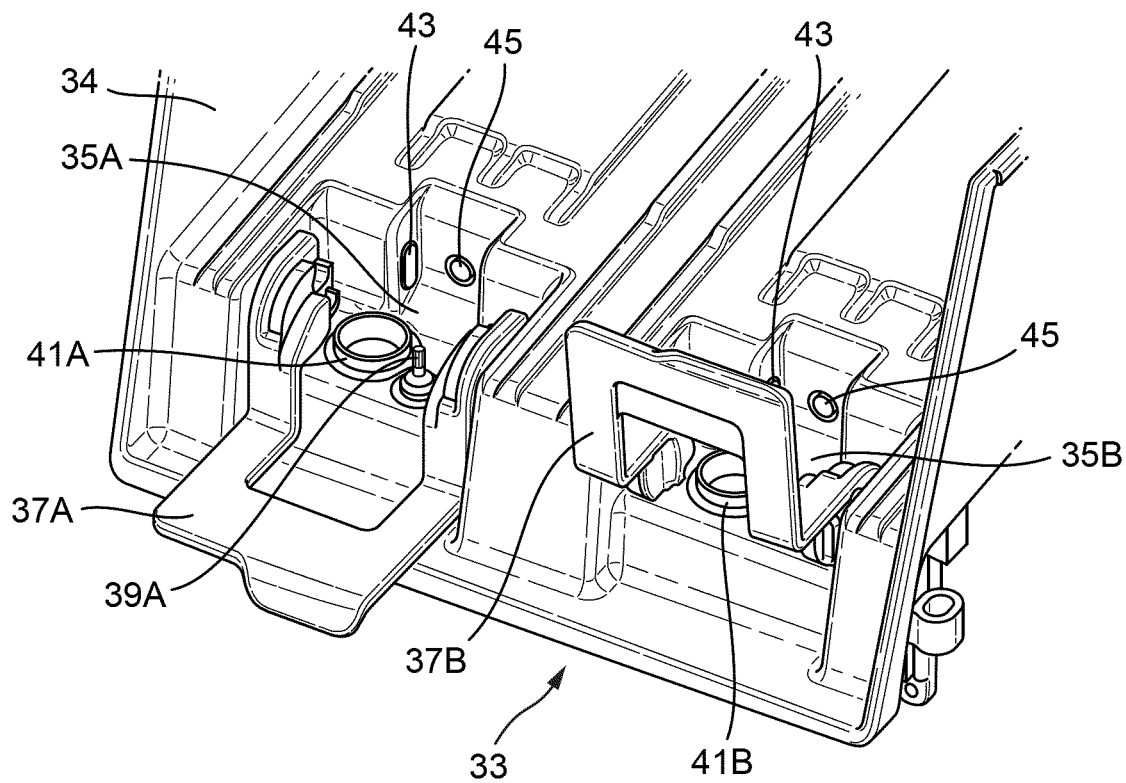
FIG. 5 shows a detail of a loading channel after opening a front hatch of the appliance of FIG. 1.

A detail of a loading channel 33 inside the supply pack compartment of the appliance 3 is shown in FIG. 5. This loading channel 33 is normally behind the front hatch 5 of the appliance 3 as shown in FIG. 1 and has a generally vertical perimeter wall 34 defining rear and side walls of the supply pack compartment. The loading channel 33 illustrated in FIG. 5 is arranged for receiving two supply packs 13 in a side-by-side relationship. The outer container housing 15 during insertion into the supply pack compartment will be guided by one of the side walls defined by the perimeter wall 34. Each supply pack 13 will be inserted with its doser 19 in a trailing position and as seen in FIG. 5 the loading channel 33 further has first and second cavities 35A, 35B in a bottom surface for accommodating the respective doser 19 of a supply pack 13 inserted in the left or right hand part of the loading channel 33. Each parallel part of the loading channel 33 has a lever 37A, 37B associated with its confronting cavity 35A, 35B. The left hand lever 37A is shown in its unlocked position ready to receive a supply pack 13, while the right hand lever 37B is shown in a locked position, but without a supply pack inserted. Each cavity 35A, 35B has a protruding drive shaft 39A, 39B (the drive shaft 39B in FIG. 5 is hidden by lever 37B), and a female ingredient receiving connection 41A, 41B. These drive shafts 39A, 39B and female ingredient receiving connections 41A, 41B are each positioned for engaging the drive port 25 and ingredient outlet port 27 of the doser 19 of the relevant supply pack 13. Each of the cavities 35A, 35B is extended by a recess for receiving the sample chamber 31 of the doser 19. Sensors 43, 45 are arranged in the recessed extensions of the cavities 35A, 35B to detect correct supply pack positioning, as well as product availability in the supply pack 13 through the sample chamber 31.

FIGS. 6 to 8 show several stages of supply pack insertion and connection. As these procedures are identical for the left hand or right hand portions of the loading channel 33 the respective cavities, levers, protruding drive shafts, and female ingredient receiving connections will be commonly referred to as 35, 37, 39, and 41 respectively. As seen in FIG. 6 the supply pack 13 has just been inserted within the boundaries of the loading channel 33 and generally vertical perimeter wall 34 defining the supply pack compartment, with the shaft projection 23 into a recess 47 on one side of the lever 37. A similar recess, but not visible is provided on the other side of the lever 37 and has received the corresponding shaft projection 21. The lever 37 pivots about pivot axis 49. From the position illustrated in FIG. 6 the lever 37 is moved upwardly as shown in FIG. 7. As a result the protruding pivot stud 23, and its counterpart 21, by the recesses 47 are then moved downwardly to position the doser 19 onto the protruding drive shaft 39 (FIG. 6). At the same time, but not visible in FIG. 7 the ingredient outlet port 27 is moved in the direction of the female ingredient connection 41. The positioning and connecting of the supply pack 13 is completed as shown in FIG. 8, when the lever 37 is in its uppermost position.

Figure 10:
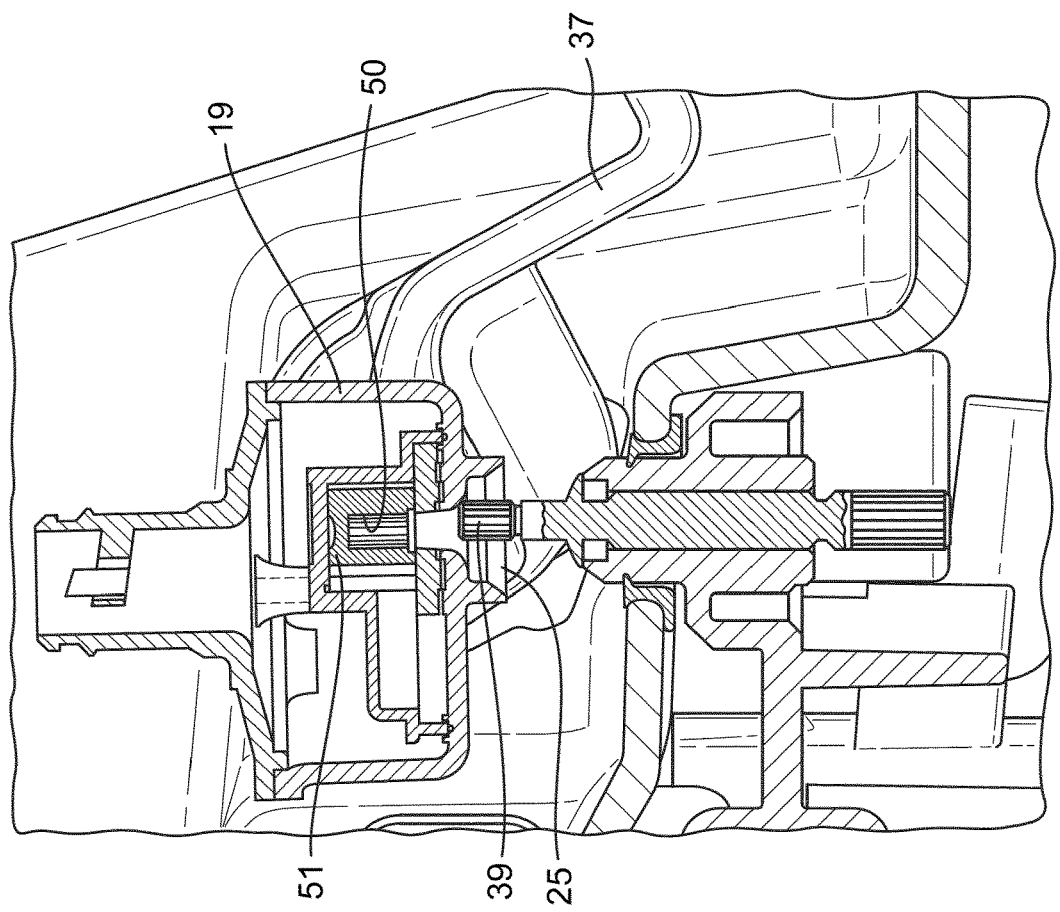
FIG. 10 is a view similar to FIG. 9, but showing the drive port of the doser in preliminary contact with the protruding drive shaft of the appliance.
Figure 9:
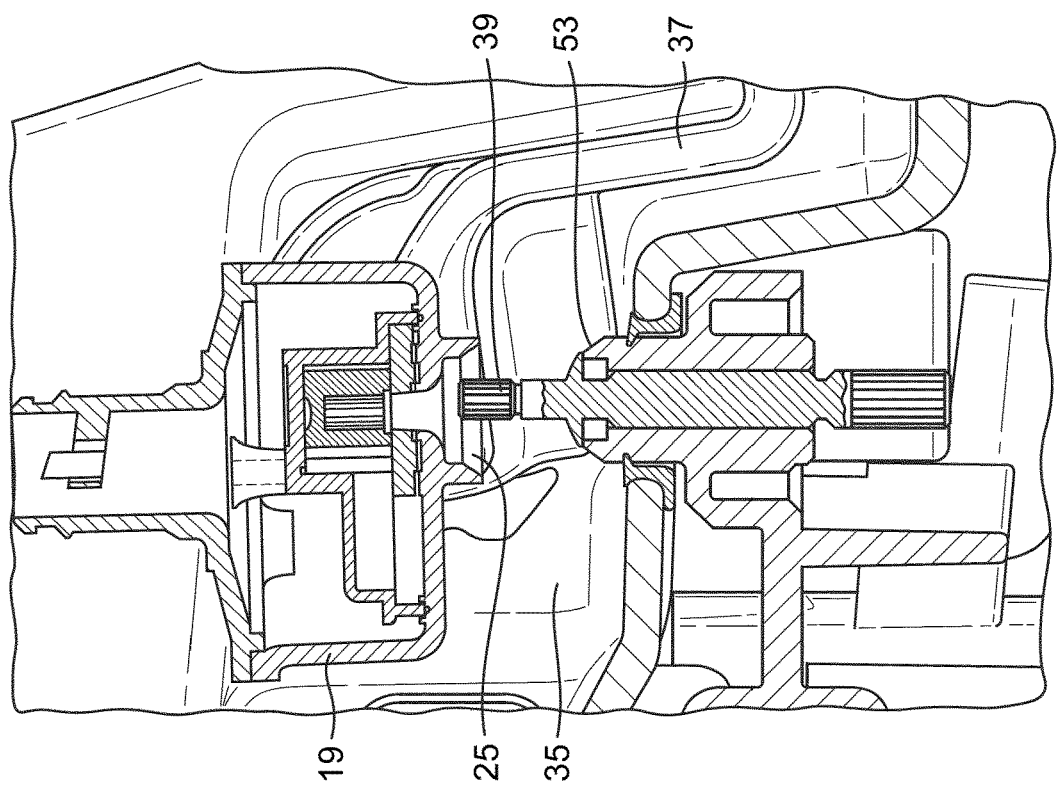
FIG. 9 is a detail in cross section that shows a drive port of the doser during connection of the supply pack approaching a protruding drive shaft of the appliance.
Figure 11:
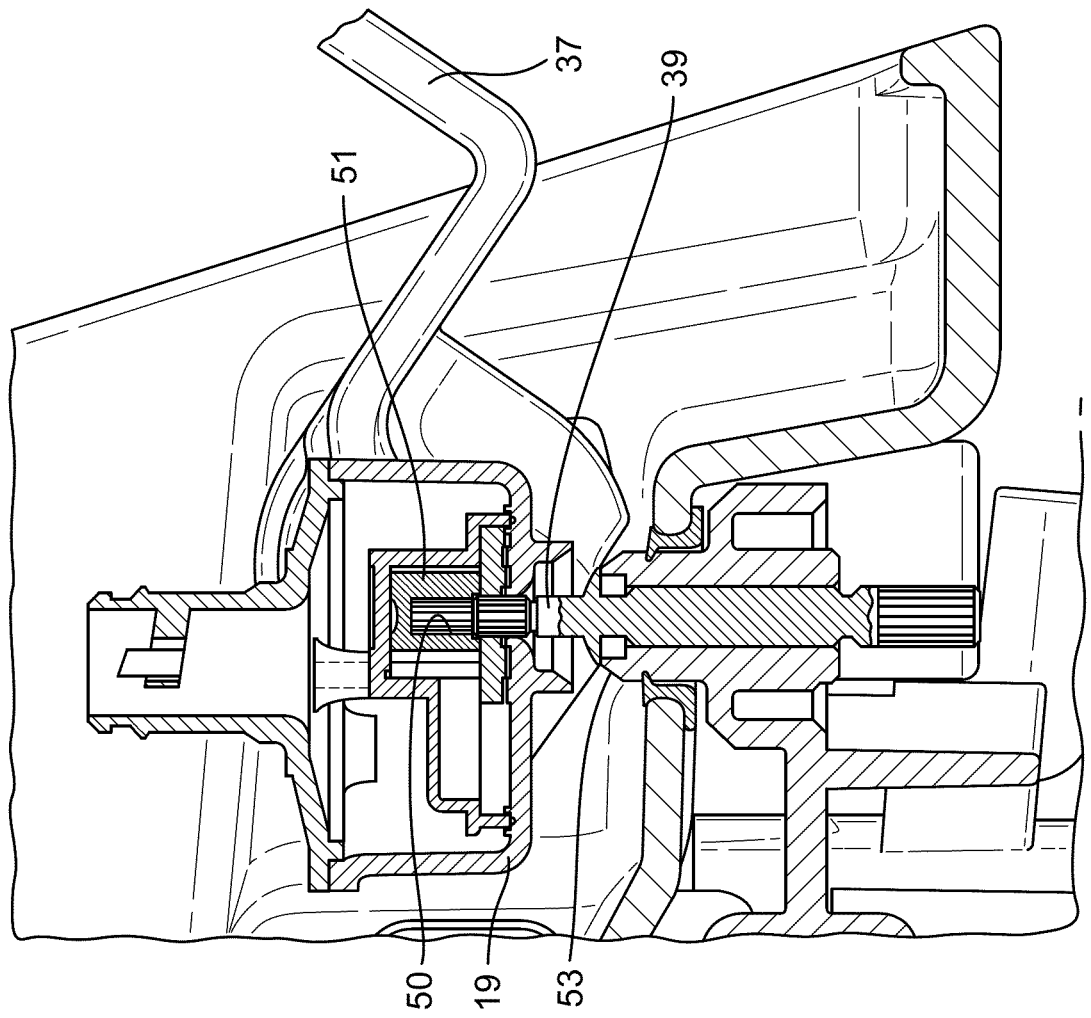
FIG. 11 is a view similar to FIG. 9, but with the protruding drive shaft of the appliance partly engaged in a drive pinion of the doser pump.

As will now be further explained in reference to FIGS. 9 to 14 special provisions ensure that both drive port 25 and ingredient outlet port 27 of the doser 19 are correctly and reliably mated to the protruding drive shaft 39 and female ingredient receiving connection 41 of the appliance 3. As shown in FIG. 9 the doser 19 will touch the boundary of the cavity 35 on the left hand side of FIG. 9. It is seen that the protruding shaft 39 is within the boundaries of a funnel shaped portion of the drive port 25 of the doser 19. It may be noticed that the housing 15 of the supply pack 13 is deleted from FIGS. 9 to 14 for clarity. The relative positions of supply pack and appliance in FIG. 9 substantially corresponds to that of FIG. 6, As shown in FIG. 10 the lever 37 has been moved substantially to the position of FIG. 7. In this position of the lever 37 the protruding shaft 39 touches the tapered inner wall of the funnel shaped entrance portion of the drive port 25 to be further guided into a central bore 50 of a drive pinion 51 within the doser 19. Engagement of the protruding drive shaft 39 with the central bore 50 of the drive pinion 51 is shown in FIG. 11 where the lever 37 is moved further beyond the position shown in FIG. 10. Finally, when the lever 37 is moved to the position of FIG. 8, the protruding shaft 39 is fully engaged with the drive pinion 51 as shown in detail in FIG. 12.

In FIGS. 13 and 14 connection of the ingredient outlet port 27 of the doser 19 with the female ingredient connection 41 is shown in cross section.

Figure 12:
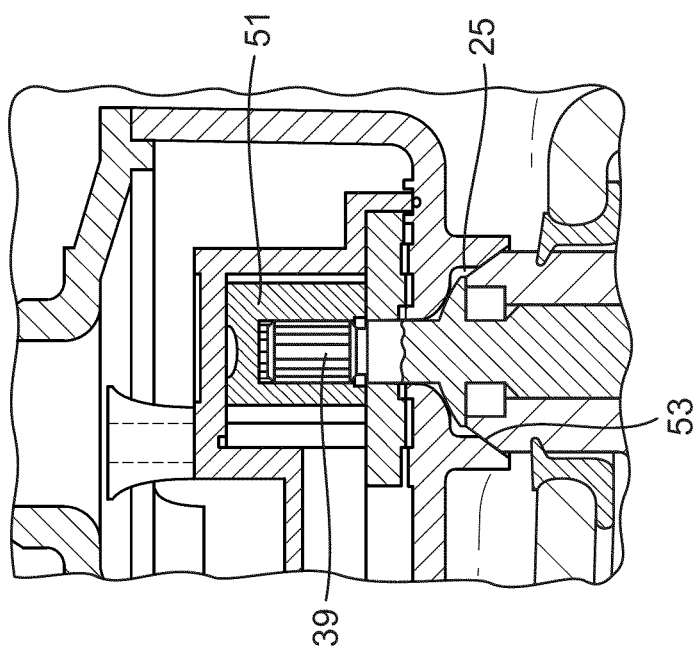
FIG. 12 is a detail view corresponding to the situation of FIG. 8 and shows the protruding drive shaft of the appliance fully engaged in the drive pinion of the doser pump.

The cross sections of FIGS. 13 and 14 are at a different location from those of FIGS. 10 to 12 as may be understood from the respective positions of the protruding drive shaft 39 and the female ingredient connection 41 as apparent from FIG. 5. The position of the lever 37 as shown in FIG. 13 corresponds substantially with that of FIG. 6 where the doser 19 is just about touching the inward boundary of the cavity 35. When moving the lever 37 upwardly as shown in FIG. 14 the recess 47 of the lever 37 is forcing the projecting pivot stud 21 in a downward direction guided by the protruding shaft 39 and the tapered drive port 25 as shown in FIGS. 9 to 12. This will ensure that the annular seal 29 enters the female ingredient receiving connection 41 in a properly aligned fashion. It will be clear to a skilled person that the flexible and resilient annular seal 29 cannot itself offer any assistance in guiding of the ingredient outlet port 27 with respect to the female ingredient receiving connection 41. It will thus be understood that guiding of the ingredient connection is accomplished by a three point cooperation between the opposite protruding pivot studs 21, 23 and the doser 19 abutting the inner boundary of the cavity 35. Furthermore the guidance is continued by the protruding shaft 39 and the tapered inner wall of the drive port 25.

Figure 15:
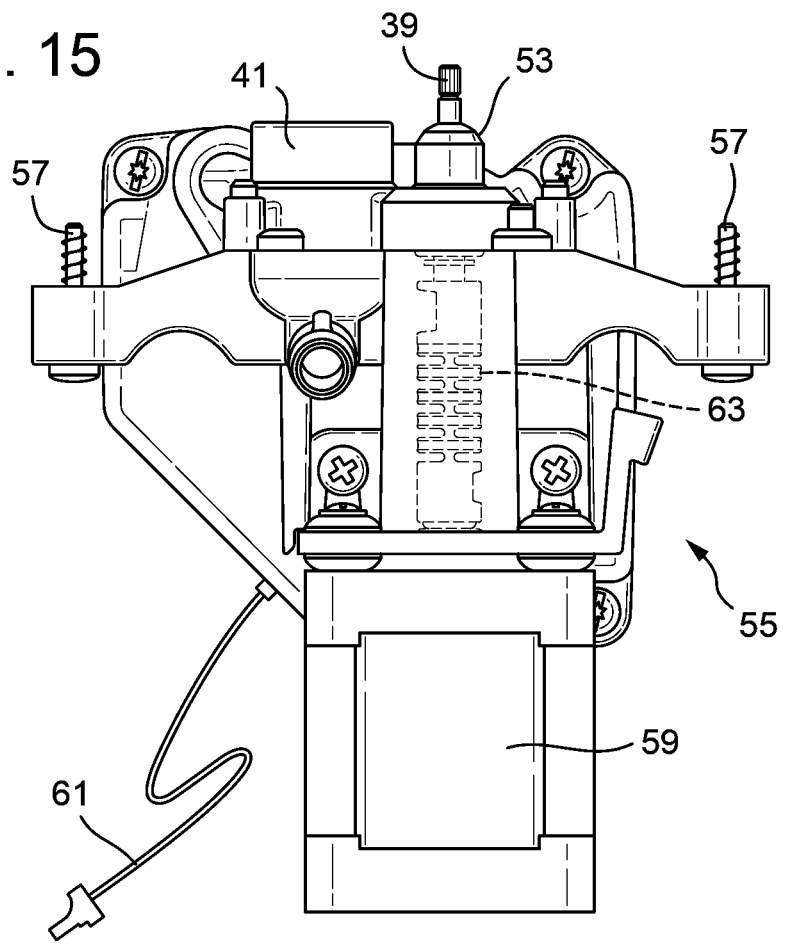
FIG. 15 is a front elevation of a drive assembly of the appliance, showing in a modified drive shaft.
Figure 16:
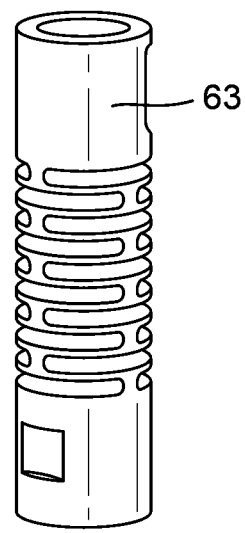
FIG. 16 shows a flexible drive connection as used in the modified drive shaft of FIG. 15.

A further improvement will now be explained in reference to FIGS. 15 and 16. As already indicated in FIGS. 9 to 12 the protruding drive shaft 39 of the appliance 3 is surrounded by a convex boss 53, which mates with the concave tapered interior of the drive port 25 (see FIG. 12). As shown in FIG. 15 the protruding drive shaft 39 and the female ingredient receiving connection 41 are both part of a drive unit 55 which is mounted inside the appliance 3 by means of screws 57. The drive unit 55 also includes an electric stepper motor 59, which is energized through a cable connection 61. As further seen in FIG. 15 the protruding shaft 39 is coupled to the electric motor 59 by means of a flexible shaft connection 63. The flexible shaft connection 63, which is shown in more detail in FIG. 16, enables the protruding drive shaft 39 to flex during its connection to the drive pinion 51, but also to compensate for small misalignments upon complete engagement.

Accordingly a system 1 is disclosed for preparing beverage consumptions, comprising an appliance 3 arranged for preparing and dispensing a beverage consumption; and at least one exchangeable supply pack 13 arranged for holding and supplying a beverage related ingredient. The appliance 3 includes a loading channel 33 arranged for receiving the at least one exchangeable supply pack 13. The at least one exchangeable supply pack 13 is provided with a container 15 for holding a beverage related ingredient, a drive port 25 for receiving a protruding drive shaft and an ingredient outlet port 27. The loading channel 33 of the appliance 3 has a protruding drive shaft 39; 39A; 39B for transmitting torque from the appliance 3 to the at least one exchangeable supply pack 13, and an ingredient receiving connector 41; 41A; 41B for conveying the beverage related ingredient from the at least one exchangeable supply pack 13 to the appliance 3. The appliance 3 includes means, such as a lever 37; 37A; 37B, arranged for guided coupling the drive port 25 and ingredient outlet port 27 of the at least one supply pack 13 simultaneously to the drive shaft 39; 39A; 39B and the ingredient receiving connector 41; 41A; 41B of the appliance 3. The drive port 25 includes an opening with a concave tapered inner wall defining a funnel shape and adapted to cooperate with the protruding drive shaft 39; 39A; 39B to assist in aligning the ingredient outlet port 27 with respect to the ingredient receiving connector 41; 41A; 41B during coupling of the at least one supply pack 13 to the appliance 3.

It is thus believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims.

The invention claimed is:

1. A system for preparing beverage consumptions, comprising:
    an appliance arranged for preparing and dispensing a beverage consumption; and
    at least one exchangeable supply pack arranged for holding and supplying a beverage related ingredient, wherein
    the appliance includes a loading channel arranged for receiving the at least one exchangeable supply pack,
    the at least one exchangeable supply pack being provided with a container for holding a beverage related ingredient, a drive port for receiving a protruding drive shaft and an ingredient outlet port,
    the loading channel of the appliance has the protruding drive shaft for transmitting torque from the appliance to the at least one exchangeable supply pack, and an ingredient receiving connector for conveying the beverage related ingredient from the at least one exchangeable supply pack to the appliance,
    the appliance being arranged for allowing engagement of the drive port to the protruding drive shaft and engagement of the ingredient outlet port of the at least one exchangeable supply pack to the ingredient receiving connector of the appliance,
    wherein the drive port includes an opening with a concave tapered inner wall defining a funnel shape adapted to cooperate with the protruding drive shaft to assist in aligning the ingredient outlet port with respect to the ingredient receiving connector during coupling of the at least one exchangeable supply pack to the appliance.

2. The system according to claim 1, wherein the ingredient outlet port has a flexible annular seal.

3. The system according to claim 2, wherein the ingredient receiving connector has a funnel shaped opening with an inner wall adapted to engage the flexible annular seal.

4. The system according to claim 1, wherein the at least one exchangeable supply pack includes a doser for expelling dosed amounts of the beverage related ingredient from the container through the ingredient outlet port.

5. The system according to claim 4, wherein the drive port is part of the doser, and arranged to receive the protruding drive shaft for transmitting a driving torque to a pump within the doser.

6. The system according to claim 4, wherein the doser protrudes from the container.

7. The system according to claim 6, wherein the loading channel of the appliance includes a cavity arranged for receiving the protruding doser of the exchangeable supply pack, and wherein the protruding drive shaft, and the ingredient receiving connector are associated with the cavity.

8. The system according to claim 7, wherein the loading channel comprises a perimeter wall defining rear and side walls of the exchangeable supply pack compartment, and wherein the cavity for accommodating the respective doser is in a bottom surface of the loading channel.

9. The system according to claim 7, wherein the drive port and ingredient outlet port are arranged on a lower face of the doser, and wherein the protruding drive shaft and the ingredient receiving connector are arranged on a bottom wall of the cavity.

10. The system according to claim 4, wherein the appliance includes one or more levers arranged for engaging the doser for coupling the drive port and ingredient outlet port of the at least one exchangeable supply pack simultaneously to the drive shaft and the ingredient receiving connector of the appliance.

11. The system according to claim 4, wherein an exterior contour of the doser, and an interior contour of the cavity are shaped complementary to one another to additionally assist in aligning the ingredient outlet port with respect to the ingredient receiving connector during coupling of the at least one exchangeable supply pack to the appliance.

12. The system according to claim 10, wherein the doser includes opposite laterally protruding pivot studs, and wherein the one or more levers are arranged to mechanically engage the laterally protruding pivot studs for positioning and moving the doser.

13. The system according to claim 7, wherein the loading channel is arranged to permit the doser to be manipulated between a position with the doser of the exchangeable supply pack received in the cavity and a position in which the exchangeable supply pack is fully connected to the appliance.

14. The system according to claim 7, wherein one or more sensors are associated with the cavity for detecting at least one of proper exchangeable supply pack positioning and availability of beverage related ingredient in a positioned exchangeable supply pack.

15. The system according to claim 14, wherein the one or more sensors are arranged to communicate with a control unit to assist in controlling at least one of a start-up cycle and individual dosing cycle.

16. The system according to claim 1, wherein the protruding drive shaft includes a flexible portion configured to flex when the protruding drive shaft engages the drive port to compensate for misalignments.

17. The system according to claim 1, wherein the protruding drive shaft protrudes from a convex boss on the appliance, which convex boss is adapted to mate with the concave interior shape of the drive port when the at least one exchangeable supply pack is fully engaged with the appliance after being coupled thereto.

18. The system according to claim 1, wherein the container defines an outer bound of the at least one exchangeable supply pack, which is arranged to mate with the loading channel, and effective to further assist in the aligning of the ingredient outlet port with respect to the ingredient receiving connector during coupling of the at least one exchangeable supply pack to the appliance.

19. The system according to claim 1, wherein the container is a flexible bag housed in a rigid enclosure.

20. A method of positioning at least one exchangeable supply pack arranged for supplying a beverage related ingredient on an appliance for preparing and dispensing a beverage, the method comprising:
  positioning the at least one exchangeable supply pack into a loading channel of the appliance,
  the appliance being arranged for allowing engagement of a drive port of the exchangeable capsule to a protruding drive shaft of the appliance and engagement of an ingredient outlet port of the at least one exchangeable supply pack to the ingredient receiving connector of the appliance,
  operating one or more levers of the appliance so that the drive port engages the protruding drive shaft and so that the ingredient outlet port engages the ingredient receiving connector, and
  ensuring that an opening with a concave tapered inner wall of the drive port defining a funnel shape cooperates with the protruding drive shaft to assist in aligning the ingredient outlet port with respect to the ingredient receiving connector.

21. The method according to claim 20, wherein:
  the appliance includes the loading channel arranged for receiving the at least one exchangeable supply pack,
  the at least one exchangeable supply pack comprises a container for holding the beverage related ingredient, the drive port for receiving a protruding drive shaft and the ingredient outlet port,
  the loading channel of the appliance has the protruding drive shaft for transmitting torque from the appliance to the at least one exchangeable supply pack, and the ingredient receiving connector for conveying the beverage related ingredient from the at least one exchangeable supply pack to the appliance,
  the appliance is arranged for allowing coupling the drive port and ingredient outlet port of the at least one exchangeable supply pack simultaneously to the protruding drive shaft and the ingredient receiving connector of the appliance, wherein the drive port includes the opening with the concave tapered inner wall defining the funnel shape adapted to cooperate with the protruding drive shaft to assist in aligning the ingredient outlet port with respect to the ingredient receiving connector during coupling of the at least one exchangeable supply pack to the appliance.

22. The system according to claim 1, wherein the engagement of the drive port and the protruding drive shaft is simultaneous to the engagement of the ingredient outlet port to the ingredient receiving connector.

* * * * *